(No Model.)
W. G. STEVENSON.
LUBRICATOR FOR UPRIGHT SHAFTS.
No. 473,269. Patented Apr. 19, 1892.
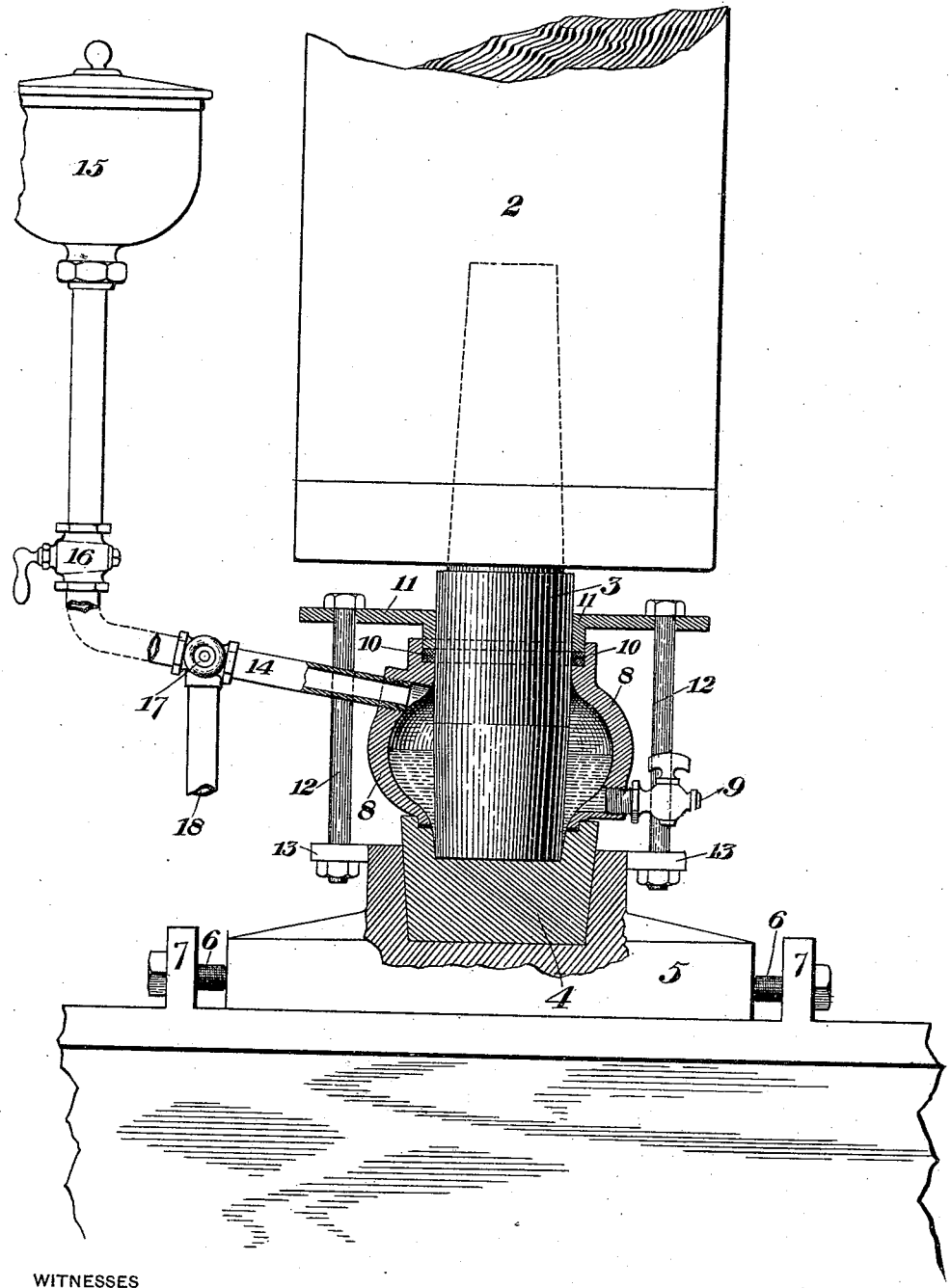

UNITED STATES PATENT OFFICE.

WILLIAM G. STEVENSON, OF WELLSVILLE, OHIO, ASSIGNOR TO STEVENSON & CO., OF SAME PLACE.

LUBRICATOR FOR UPRIGHT SHAFTS.

SPECIFICATION forming part of Letters Patent No. 473,269, dated April 19, 1892.

Application filed May 19, 1891. Serial No. 393,299. (No model.)

*To all whom it may concern:*

Be it known that I, WILLIAM G. STEVENSON, of Wellsville, in the county of Columbiana and State of Ohio, have invented a new and useful Improvement in Lubricators for Upright Shafts, of which the following is a full, clear, and exact description, reference being had to the accompanying drawing, which represents a side elevation, partly in section, of my improved oiler.

This oiler is especially designed for use in grinding machinery, such as that of my co-pending application, Serial No. 393,298, filed May 19, 1891, but may be used to advantage upon the bottom step of any vertical shaft.

In the drawing, 2 represents a vertical shaft, which rests upon a spindle 3, entering a tapering hole in the bottom of the shaft, which spindle in turn rotates in the step 4. The step 4 is seated in a suitable recess in the bottom plate 5, which plate is laterally adjustable upon the foundation-plate by means of the screws 6, passing through lugs 7. Surrounding the spindle 3 is the collar or reservoir 8, having an annular recess therein and provided with the stop-cock 9. This collar rests in an annular groove in the step 4, a suitable packing being interposed therebetween, and at its top portion closely encircles the spindle. An annular groove 10 is provided in the inner edge of the top of the collar, in which suitable packing material is compressed by the ring 11, which may be forced downwardly by bolts 12, passing through said ring and through projecting lugs 13 on the bottom plate. Entering the upper portion of the collar is the pipe 14, which connects with the elevated oil-reservoir 15. The pipe 14 is provided with a cock 16 and below said cock with a valve 17, which serves to connect said pipe with a steam-pipe 18.

The operation is as follows: The cock 16 being opened and the valve 17 closed, oil flows into the reservoir in the desired quantity and automatically lubricates the bearing. Whenever by continued use oil becomes gummed in the bearing, the cock 16 being closed and the valve 17 and the cock 9 being opened, steam is admitted and effectually liquefies and blows out the oil and other obstructing substances, rendering the bearing again clean and ready for use.

The advantages of my device are obvious. The bearing being entirely inclosed, dirt is prevented from entering the same, while a steady and automatic flow of oil is supplied, the bearing being adjusted by the screws 6 when necessary to prevent binding, while removal of the refuse oil is made easy by the steam-supply.

I do not wish to restrict myself to the specific form shown, as many changes in the form and arrangement of the parts will suggest themselves to those skilled in the art; but

What I claim is—

1. An oiling device for vertical shafts, comprising an annular reservoir surrounding the shaft and resting upon the shaft-step, a suitable packing in the upper edge of said reservoir, and means for compressing said packing around the shaft, substantially as and for the purposes described.

2. An oiling device comprising an oil-reservoir encircling the lower portion of the shaft, a blow-off cock leading therefrom, and a steam-pressure pipe leading into said reservoir, substantially as and for the purposes described.

3. An oiling device comprising an annular reservoir surrounding the shaft and having a blow-off pipe, a valved oil-supply pipe leading to the reservoir, and a valved steam-pipe leading to the oil-supply pipe between the oil-valve and the reservoir, substantially as and for the purposes described.

In testimony whereof I have hereunto set my hand this 16th day of May, A. D. 1891.

WILLIAM G. STEVENSON.

Witnesses:
P. M. SMITH,
W. E. SMITH.